(12) United States Patent
Wolf

(10) Patent No.: US 6,475,063 B2
(45) Date of Patent: Nov. 5, 2002

(54) GRINDING DEVICE

(75) Inventor: Helmut Wolf, Zweibrucken (DE)

(73) Assignee: Deere & Company, Moline, IL (US)

( * ) Notice: Subject to any disclaimer, the term of this patent is extended or adjusted under 35 U.S.C. 154(b) by 26 days.

(21) Appl. No.: 09/828,526

(22) Filed: Apr. 6, 2001

(65) Prior Publication Data

US 2001/0034187 A1 Oct. 25, 2001

(30) Foreign Application Priority Data

Apr. 11, 2000 (DE) .......................................... 100 17 985

(51) Int. Cl.[7] .............................................. B24B 49/00
(52) U.S. Cl. ............................ 451/5; 451/21; 451/11; 451/45; 451/93; 451/419; 451/540
(58) Field of Search ................................. 451/6, 11, 21, 451/45, 93, 419, 420, 540, 548, 8, 9, 10

(56) References Cited

U.S. PATENT DOCUMENTS 4,834,303 A    5/1989   McClure et al.
4,843,767 A  * 7/1989   Johnson ...................... 451/420
4,934,612 A  * 6/1990   Johnson ........................ 241/37

FOREIGN PATENT DOCUMENTS

DE         41 33 043         4/1993

* cited by examiner

*Primary Examiner*—Joseph J. Hail, III
*Assistant Examiner*—Shantese McDonald

(57) ABSTRACT

An automatic grinding device for sharpening the knives of a forage harvester chopper drum includes a controller including a counter for counting the number of times the grindstone is adjusted toward the chopper drum during sharpening operation. The controller includes a microprocessor having a non-volatile memory in which may be stored a threshold value, determined by the type of grindstone, to which the count of the counter may be compared for generating a signal indicating the degree of wear of the grindstone so that it may be replaced when worn out.

9 Claims, 4 Drawing Sheets

GRINDING DEVICE

FIELD OF THE INVENTION

The invention pertains to a grinding device with a grindstone for sharpening a knife, a device for adjusting the grindstone toward the knife and a control unit.

The present invention can be utilized in a series of devices with knives to be sharpened. It is, in particular, advantageous in self-contained field choppers or towed harvesting machines with chopping drums.

BACKGROUND OF THE INVENTION

DE 4133043 A describes a grinding machine in which a grinding device is assigned to knives. Each cutting process is registered by a counting mechanism and the grinding process is carried out depending on the number of cuts.

U.S. Pat. No. 4,843,767, granted to Johnson on Jul. 4, 1989, discloses a grinding device for the chopping drum of a self-propelled field chopper. In this case, first and second electric motors, respectively provided for moving the grindstone to and from engagement with the knives of the chopper drum, and for sweeping the grindstone lengthwise of the chopper drum, are controlled by a system including a microprocessor and a counter which counts the number of sweeps or cycles of the grindstone and compares it to a preset threshold of the number of sweeps or cycles required to sharpen the chopper drum knives.

U.S. Pat. No. 4,834,303, granted to McClure et al. on May 30, 1989, discloses a grinding device for the chopping drum of a self-propelled field chopper. In this case, a switch, actuated by the grindstone holding arrangement once the grindstone should no longer be adjusted toward the knife due to excessive wear, is arranged in the vicinity of the end of the grindstone which faces the chopping drum. Due to this measure, the operator is informed that the grindstone, which is axially adjustable in its holder, needs to be manually adjusted closer to the knife. In addition to the costs for the switch, it is disadvantageous that the operator is only informed that the grindstone is worn out once the latter needs to be replaced.

SUMMARY OF THE INVENTION

According to the present invention, there is provided an improved grinding device.

An object of the invention is to provide a grinding device having a control unit which informs an operator of the degree to which a grind stone is worn.

A more specific object of the invention is to provide a grinding device wherein a control for feeding the grindstone towards a knife being sharpened informs the user when the grindstone is used up. This is done by storing a threshold value representing the number of feeding procedures that can be done for a certain type of grindstone before it is used up and to count either up to, or down from, the threshold value in order to obtain the signal that notifies the user when the grind stone needs to be replaced.

These and other objects will become apparent from a reading of the ensuing description together with the appended drawings.

DESCRIPTION OF THE PREFERRED EMBODIMENT

Figure 1:
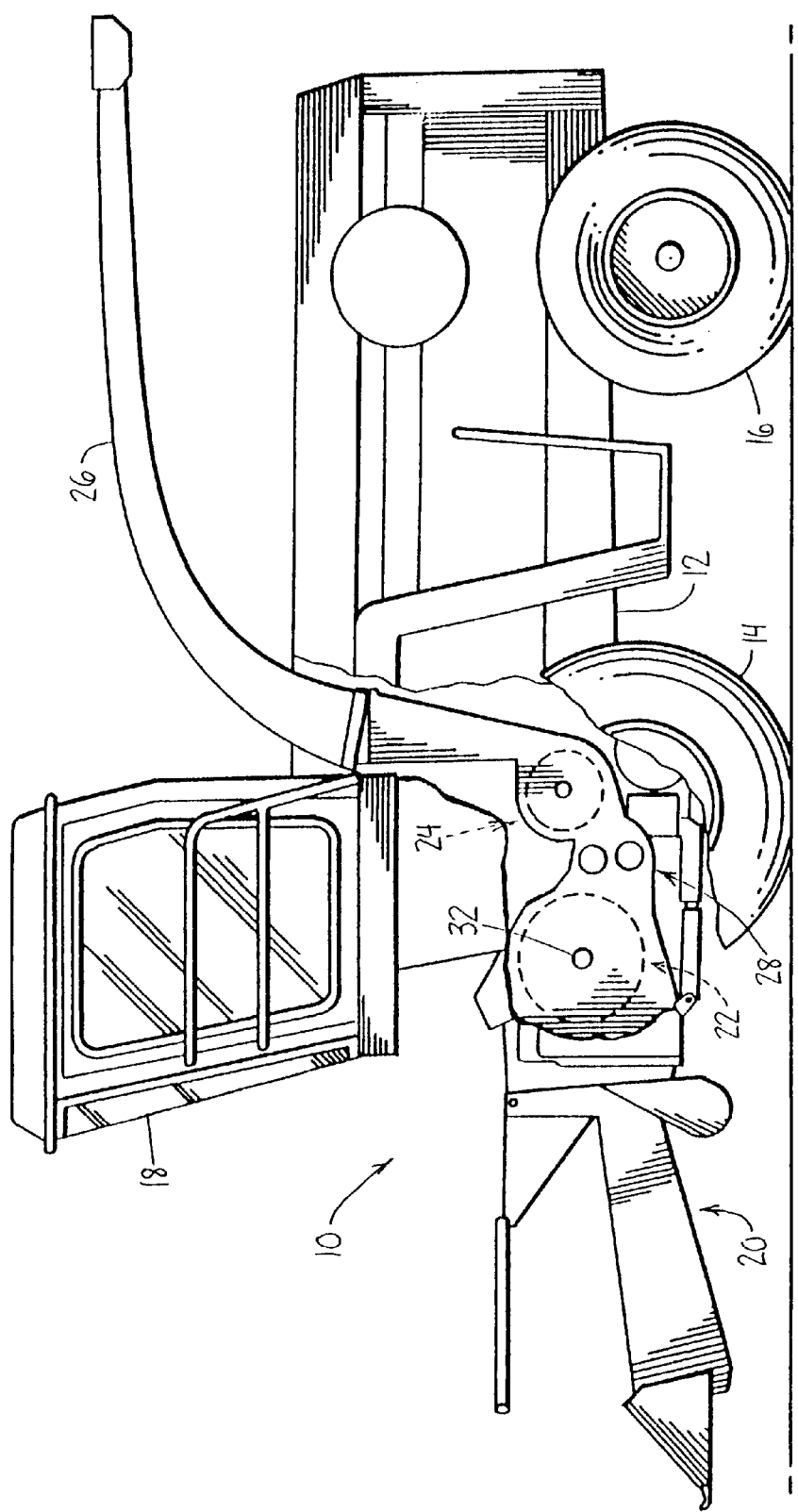
FIG. 1 is a schematic side view of a harvesting machine that contains a chopping drum equipped with a grinding device.

A harvesting machine 10, which is shown in FIG. 1 and realized in the form of a field chopper, is arranged on a frame 12 that is carried by front wheels 14 and rear wheels 16. The harvesting machine 10 is operated from a driver cabin 18, from which the operator is able to observe a harvest material collection device 20. Material, e.g., corn, grass or the like, which was picked up from the ground by means of the harvest material collection device 20 is fed to a chopping drum 22 that chops the harvest material into small pieces and delivers those pieces to a transport device 24. The material is transported by means of a rotatable delivery chute 26 from the harvesting machine 10 to a trailer that drives adjacent to the harvesting machine. A subsequent comminution device 28, by means of which the material to be transported is tangentially fed to the transport device 24, extends between the chopping drum 22 and the transport device 24.

Figure 2:
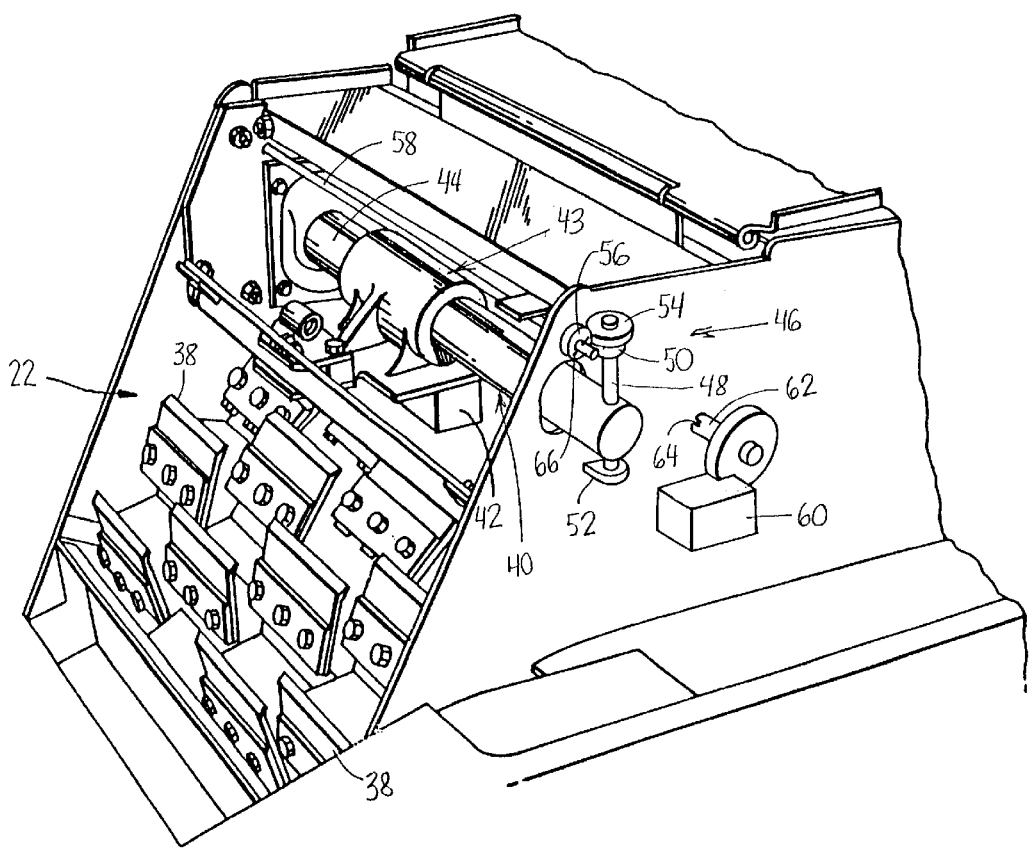
FIG. 2 is a right rear perspective, partially exploded view of a portion of the chopping drum together with a grinding device including the mechanism for adjusting the grindstone vertically to and from contact with the knives of the chopping drum.

Referring now to FIG. 2, there is shown the chopping drum 22 including a plurality of knives 38 that are distributed over its width and its circumference and comminute harvest material picked up from the ground by the harvest material collecting device 20 in cooperation with a rigid counter knife (not shown) positioned adjacent a lower front location of the chopping drum 22. The chopping drum 22 contains a central shaft 32 (FIG. 1) that is rotationally driven by a motor of the harvesting machine 10 via a pulley (not shown) mounted on an outer end portion of the shaft 32. The shaft 32 is supported on the frame 12 of the harvesting machine 10 by means of two bearings (not shown) respectively arranged on opposite sides of the chopping drum 22.

In order to make it possible to sharpen the knives 38 after a certain operating time without having to remove the individual knives 38 or the entire chopping drum 22, a grinding device 40 is provided above the chopping drum 22 near the envelope circle described by the knives 38. This grinding device 40 essentially includes a grindstone 42 mounted to a grindstone holding arrangement or carriage 43 which, in turn, includes a cylindrical tubular portion mounted for sliding axially along a cylindrical guide shaft or rod 44. Provided for supporting and selectively lowering and raising the guide shaft 44 towards and away from the cutting circle of the chopping drum 22 so as to selectively position the grindstone 42 for sharpening contact with the knives 38 is a vertical adjustment mechanism 46 including a threaded rod 48 received in a threaded bore extending diametrically through the shaft 44. The threaded rod 48 is rotatably mounted in, while being prevented from shifting axially in, upper and lower brackets 50 and 52, respectively. Mounted to the top of the threaded rod 48 is a driven gear 54 meshed with a drive gear 56 that is mounted to a vertical adjustment drive shaft 58 that extends parallel to the guide shaft 44.

Although not shown, the left-hand end of the guide shaft 44 is supported on a threaded rod like rod 48 and a drive gear at the left-hand end of the drive shaft 58 is meshed with a driven gear at the top of the threaded rod. The drive and driven gears 56 and 54, and the similar gears at the opposite side of the chopper drum 22, each make up a worm gear set that act to effect vertical movement of the guide shaft 44, and hence of the grindstone 42, in response to the drive shaft 58 being rotated in the desired direction to effect the desired vertical movement. Driving of the shaft 58 is accomplished by a reversible electric motor 60 having a tubular receptacle 62 fixed to its output shaft (not visible), the receptacle 62 having a diametrical slot 64 provided in its outer end which engages a cross pin 66 mounted in the outer end portion of the drive shaft 58.

Figure 3:
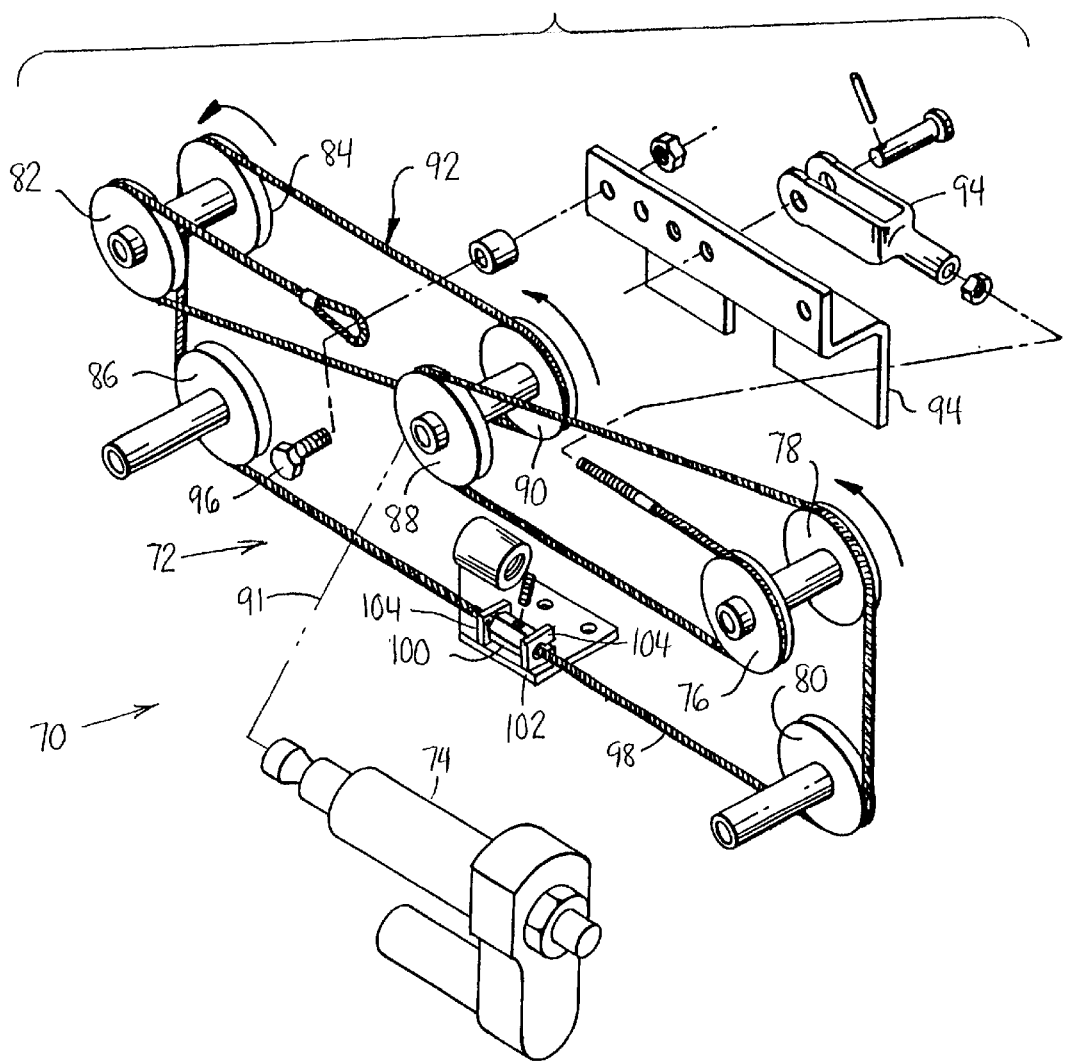
FIG. 3 is a partially exploded schematic view of the mechanism for sweeping the grindstone back and forth between right- and left-hand end positions during a grinding operation.

Referring now to FIG. 3, a somewhat schematic grindstone sweep mechanism 70 is shown, which includes a cable and pulley arrangement 72 that works together with a reversible linear electric motor 74 to move the grindstone carriage 43 back and forth along the guide shaft or rod 44. Specifically, the cable and pulley arrangement 72 includes a right-hand set of fixed pulleys comprising a coaxial pair of upper right-hand pulleys 76 and 78, and a lower right-hand pulley 80, and a left-hand set of fixed pulleys located in transverse alignment with the right-hand set and comprising a coaxial pair of upper left-hand pulleys 82 and 84, and a left-hand lower pulley 86. Shown in a position halfway between the right-and left-hand fixed pulley sets and in transverse alignment with the upper right-and left-hand pairs of fixed pulleys is a coaxial pair of transversely shiftable pulleys 88 and 90. For the sake of simplicity, the structure for supporting and guiding the transverse movement of the pulleys 88 and 90 is not shown, with the laterally shiftable portion of the brackets and their connection to the drive motor 74 being indicated by the functional line 91. A cable 92 is engaged with the various pulleys of the pulley arrangement 72, with a right-hand end section extending about the. outer portions of pulleys 80 and 78 and then respectively about the right- and left-hand portion of the pulleys 88 and 76, terminating in a threaded end onto which is threaded a clevis 94 which is pinned to a cable anchor bracket 96. A left end section of the cable 92 is engaged with the lower and upper, fixed left-hand pulleys 86 and 84, respectively, and then extends about the moveable center pulley 90 and then back under and about the pulley 82. The left end section of the cable 92 terminates in an eyelet which is secured to the bracket 94 by a bolt 96. Extending transversely between the lower pulleys 80 and 86 is a straight cable run 98 having a tubular drive element 100 adjustably fixed thereto by a set screw. The grindstone carriage 43 has a drive connection plate 102 bolted thereto and provided with a parallel pair of upstanding, lugs 104 snugly engaged with opposite ends of the drive element 100 and each having a receptacle receiving the cable run 98. Thus, it will be appreciated that the pulley arrangement acts to multiply the lateral shifting movement of the output of the drive motor 74 to cause the grindstone carriage 43 to be moved between extreme right- and left-hand positions (not shown) where the grindstone 42 is out of contact with the chopper drum knives 38.

The grinding arrangement for the chopper drum knives, as thus far described, is that disclosed in the above-identified U.S. Pat. No. 4,843,767 to which one should resort if further details of the structure or grinding procedure is desired. Suffice it to say that when the knives 38 need to be sharpened, the chopping drum 22 is set in rotation, usually in 1the opposite rotating direction and/or with a reduced rotational speed in comparison to the normal chopping operation. The grindstone holding arrangement or carriage 43 with the grindstone 42 mounted thereon is displaced over the entire width of the chopping drum 22 from a (not-shown) idle or parking position, in which it is arranged laterally adjacent to the chopping drum 22. During this process, the underside of the grindstone 42 is in contact with and sharpens the knives 38. During the grinding process, the grindstone 42 is displaced or swept over the width of the chopping drum 22 several times by driving the motor 74 first in one direction then the other, with the reversal being made in response to the bracket 114 or other shiftable parts coming into contact with and operating right- and left-hand reverse switches when the grindstone reaches its end points.

The grindstone 42 is adjusted between the displacements, i.e., the grindstone 42 is slightly moved toward the knives 38. This adjustment can be realized by displacing the guide shaft 44 toward the knives by operation of the electric motor 60. When using grinding arrangements other than that disclosed in U.S. Pat. No. 4,843,767, it would also be conceivable to utilize a hydraulic motor or a mechanical element (ratchet wheel or the like) that cooperates with a stationary element when one or both reversal points is/are reached. In the mechanical arrangements, the rotation of the mechanical element is converted into a displacement by means of a thread such that the grindstone 42 is adjusted toward the chopping drum 22. During this process, a displacement of the grindstone 42 over a limited lateral range makes it possible to bypass an adjustment because the mechanical element would not come in contact with the stationary element in this case. Such a grinding process without an adjustment is practical during the final smoothing process.

Figure 4:
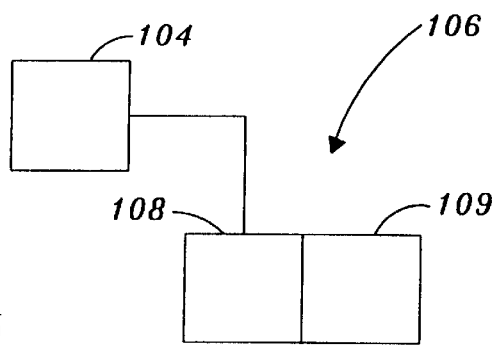
FIG. 4 is a flow chart of the steps followed for controlling the grinding device.

As with the grinding device disclosed in the above-described U.S. Pat. No. 4,934,612, the grinding device with the grindstone 42 disclosed here is controlled by a control unit including a microprocessor and serves for realizing the displacement or sweeping of the grindstone 42 as well as its vertical adjustment. The control unit may also control the operation of the chopping drum 22. With reference to the schematic representation in FIG. 4, a control unit 104 is connected to or provided with a memory 106 (non-volatile when the harvesting machine 10 is switched off), with a counter 108 being stored in a first storage area, and with a threshold value 109 being stored in a second storage area, of said memory.

Figure 5:
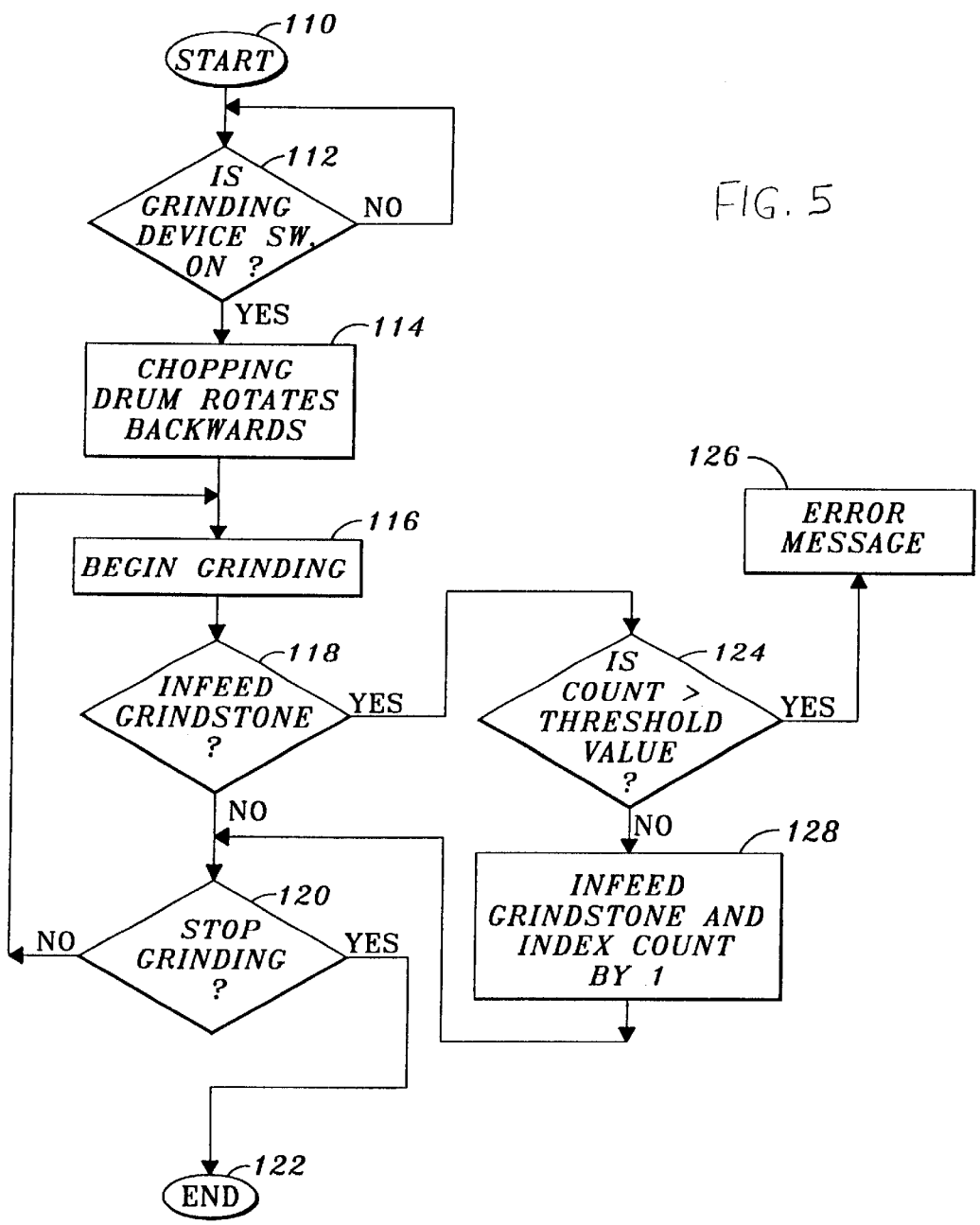
FIG. 5 is a schematic representation of the control for the grinding device.

FIG. 5 shows a flow chart, according to which the control unit 104 of the grinding device operates. After the start in step 100, e.g., after starting the motor of the field chopper 10, it is inquired in step 112 whether a corresponding (push button) switch for activating the grinding device is actuated or not (it would also be conceivable to automatically sharpen the knives 38 after a certain operating time). If the switch is not actuated, step 112 is repeated. If the switch is actuated, the next step is step 114, in which the control unit 104 causes the drive of the chopping drum 22 to turn the chopping drum in the opposite direction with a reduced rotational speed in comparison to the normal chopping operation. As soon as the chopping drum 22 turns correspondingly, the grinding process begins. In step 116, the grindstone 42 is displaced or swept over the width of the chopping drum 22 once or several times such that the knives 38 are sharpened. In step 118, it is inquired whether the grindstone 42 needs to be adjusted. The control unit 104 is provided with a suitable data bank, table or the like which makes it possible to ascertain after how many displacements the grindstone 42 is adjusted vertically toward the chopping drum. A manual input would also be conceivable. If the control unit 48 determines that no vertical adjustment is necessary, the next step is step 120, in which it is inquired whether the grinding process should be terminated. The grinding process is usually terminated after a predetermined number of displacements or sweeps; it would also be conceivable to manually input this number or to determine whether the knives 38 are sufficiently sharp or not by means of a sharpness sensor. If the grinding process should be terminated, the next step is step 122, in which the grinding process is terminated and the routine is completed or step 110 is carried out again, respectively. If the grinding process should not yet be terminated, the next step is step 116.

If it is decided in step 118 that an adjustment needs to take place, the next step is step 124, in which it is inquired whether the count of the counter 108 is greater than a predetermined threshold value 109 or not. This threshold value 109 represents the maximum number of adjustments allowed for a grindstone 42. This threshold value depends on the type, in particular, the dimensions and/or the material of the grindstone 42. The threshold value 109 is correspondingly changed by the operator if a different type of grindstone 42 is installed. This may, for example, be realized by inputting the corresponding values into the software of the control unit 104 or by setting corresponding switches. The counter 108 is also set to zero when a new grindstone 42 is installed.

If the inquiry carried out in step 124 shows that the count of the counter 108 is greater than the threshold value 109, the next step is step 126, in which an error message is generated. An adjustment process is now no longer possible because the count of the counter 108 indicates that the grindstone 42 is excessively worn out for allowing additional adjustments. Otherwise, damage to the knives 38 and/or the grindstone holding arrangement 43 would result. The operator can now interrupt the grinding process and install a new grindstone 42. It would also be conceivable to generate a second error message which informs the operator that a new grindstone will soon have to be installed once a certain degree of wear of the grindstone 42 is reached. The second error message may, for example, be generated when the count of the counter 108 corresponds to 90% of the threshold value 109. If the count of the counter 108 is not greater than the threshold value 109 in step 124, the next step is step 128, in which an adjustment process is carried out and the count of the counter is increased by 1. Step 120 follows step 128.

It should be emphasized that the counter 108 could alternatively be set to a value that corresponds to the threshold value and decreased by 1 when a new grindstone 42 is installed. In this case, the error message in step 126 is generated when the counter 108 reaches zero. It should also be emphasized that the displacement of the grindstone 42 over the width of the chopping drum 22 is not required if the grindstone extends over the entire width of the chopping drum. In this case, the counter 108 would count revolutions of the drum 22.

Having described the preferred embodiment, it will become apparent that various modifications can be made without departing from the scope of the invention as defined in the accompanying claims.

What is claimed is:

1. In a grinding arrangement including a grindstone for sharpening a knife, a device for adjusting the grindstone toward the knife, and a control unit, the improvement comprising: said control unit including a counter registering a count that is changed in accordance with a number of adjustment processes that have been carried out; said control unit including a stored, preselected threshold value; and said count of the counter being compared to said threshold value in order to generate a signal value.

2. The grinding device according to claim 1, wherein said threshold value and/or an initial count of said counter contains information regarding the maximum permissible number of adjustments of the grindstone and/or information regarding a number of adjustment processes of the grindstone which corresponds to a certain degree of wear.

3. The grinding device according to claim 1 wherein said control unit includes an inhibit control designed for inhibiting an adjustment of the grindstone and/or delivering an error message depending on the result of the comparison.

4. The grinding device according to claim 1 wherein said control unit includes a stored, preselected second threshold value which corresponds to a certain degree of wear of said grindstone.

5. The grinding device according to claim 1, wherein said counter of said control unit is capable of being set to zero when an unused grindstone is installed, with said threshold value corresponding to the number of possible adjustment processes, and with the count of said counter being increased in accordance with the number of adjustment processes that have been carried out.

6. The grinding device according to claim 1, wherein said counter of said control unit is capable of being set to a value that corresponds to the number of possible adjustment processes when a new grindstone is installed, with said count of said counter being decreased in accordance with the number of adjustment processes that have been carried out, and with said control unit being able to compare the count of the counter to the value zero.

7. The grinding device according to claim 1, wherein said threshold value or the initial count of said counter can be input, in particular, in accordance with the type of grindstone.

8. The grinding device according to claim 1, wherein said control unit is able to change the count of said counter before, during, or after a grinding process.

9. The grinding device according to claim 1, wherein said counter and/or said threshold value is/are stored in a non-volatile memory.

\* \* \* \* \*